(12) United States Patent
Nakano

(10) Patent No.: US 7,421,838 B2
(45) Date of Patent: Sep. 9, 2008

(54) DIESEL ENGINE EXHAUST GAS AFTER-TREATMENT DEVICE

(75) Inventor: Masahiko Nakano, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 99 days.

(21) Appl. No.: 11/480,702

(22) Filed: Jul. 3, 2006

(65) Prior Publication Data
US 2007/0006574 A1 Jan. 11, 2007

(30) Foreign Application Priority Data
Jul. 5, 2005 (JP) ............................. 2005-196224

(51) Int. Cl.
F01N 3/00 (2006.01)
(52) U.S. Cl. .............................. 60/295; 60/274; 60/277; 60/285; 60/297
(58) Field of Classification Search ................... 60/274, 60/277, 285, 286, 295, 297, 311, 278, 280
See application file for complete search history.

(56) References Cited
U.S. PATENT DOCUMENTS 7,048,891 B2 * 5/2006 Kinugawa et al. ............. 422/94
7,152,392 B2 * 12/2006 Kuboshima et al. ........... 60/277
7,243,491 B2 * 7/2007 Okugawa et al. .............. 60/311
7,266,944 B2 * 9/2007 Okugawa et al. .............. 60/297
2005/0143899 A1 6/2005 Ueno et al.

* cited by examiner

Primary Examiner—Binh Q Tran
(74) Attorney, Agent, or Firm—Global IP Counselors

(57) ABSTRACT

A diesel engine exhaust gas after-treatment device comprising a first temperature sensor that detects the temperature either upstream or downstream from a filter as a first temperature and detects the filter's other temperature as a second temperature, and a microcomputer. The microcomputer calculates the filter's hypothetical bed temperature from the temperature of either of the first and second temperatures; calculates the heat radiation coefficient from the filter to the external atmosphere according to the exhaust gas flow rat; and calculates the second temperature's estimated temperature based on the heat radiation coefficient and the above-described one first temperature. The filter's estimated bed temperature is found based on the above-described hypothetical bed temperature and the above-described detected second temperature and the above-described second temperature's estimated temperature. The microcomputer regenerates the filter based on the estimated bed temperature.

13 Claims, 6 Drawing Sheets

DIESEL ENGINE EXHAUST GAS AFTER-TREATMENT DEVICE

CROSS-REFERENCE TO RELATED APPLICATION

This application claims priority from Japanese Patent Application Serial No. 2005-196224 filed Jul. 5, 2005, the entire contents of which is incorporated herein by reference.

TECHNICAL FIELD

A device for exhaust gas after-treatment that treats the exhaust gas particulates of a diesel engine is described below. Specifically, an after-treatment device that performs so-called filter regenerative treatment is described where a filter to trap particulates exhausted from an engine is disposed in the exhaust gas passage and, when a predetermined amount of particulates has accumulated in the filter, the after-treatment device raises the filter temperature and combusts the particulates accumulated in the filter.

BACKGROUND

A NOx reducing catalyst is provided in the exhaust gas passage, and to keep this catalyst within a predetermined temperature range that provides a high NOx cleaning rate, it has been proposed to estimate the temperature of the catalyst and to control the rate at which the exhaust gas flows over the catalyst based on this estimated catalyst temperature.

For example, the disclosure of Laid-open Japanese Patent Application H10-68315 calculates the estimated catalyst temperature $Tc$ based on exhaust gas temperature $Tg1$ at the catalyst inlet and exhaust gas temperature $Tg2$ at the catalyst outlet using the following equation:

$Tc = p \times Tg1 + q \times Tg2$ (p and q are coefficients obtained from experimentation).

SUMMARY

A diesel engine exhaust gas after-treatment device is disclosed. In one embodiment, the after-treatment device detects the temperature either upstream or downstream from a filter as a first temperature, detects the filter's other temperature as a second temperature, calculates the filter's hypothetical bed temperature from the temperature of either the first temperature or second temperature, calculates the heat radiation coefficient from the filter to the external atmosphere according to the exhaust gas flow rate, calculates the estimated temperature of the second temperature based on the heat radiation coefficient and the first temperature, finds the filter's estimated bed temperature based on the hypothetical bed temperature and the detected second temperature and the second temperature's estimated temperature, and raises the exhaust gas temperature based on the estimated bed temperature and regenerates the filter.

According to one aspect of the invention, the filter's inlet temperature and outlet temperature are detected, the hypothetical bed temperature is calculated based on the temperature at either the inlet or outlet of the filter, the temperature difference is found between the second temperature detected as the filter's outlet temperature and the estimated temperature of the second temperature with a time lag applied to the filter's inlet temperature, and that temperature difference is fed back to the calculated hypothetical bed temperature; therefore it becomes possible to estimate the bed temperature with good precision without acquiring large amounts of data when estimating and controlling the bed temperature, and it becomes possible to avoid deterioration of the catalyst due to abnormally high temperatures when doing filter regeneration and to avoid melting and damaging the filter.

Moreover, according to one aspect of the invention, the heat radiation coefficient from the filter to the external atmosphere according to the exhaust gas flow rate is calculated and the estimated temperature of the second temperature using this heat radiation coefficient is calculated, so the second temperature's estimated temperature can be calculated with reasonable precision even if the amount of heat radiated from the filter to the external atmosphere differs according to differences in the exhaust gas flow rate.

BRIEF DESCRIPTION OF DRAWINGS

Other features and advantages of the present regeneration control device will be apparent from the ensuing description, taken in conjunction with the accompanying drawings, in which.

DETAILED DESCRIPTION

While the claims are not limited to the illustrated embodiments, an appreciation of various aspects of the exhaust gas after-treatment device is best gained through a discussion of an example thereof. Below, an embodiment of the present invention is explained based on the attached drawings.

Figure 1:
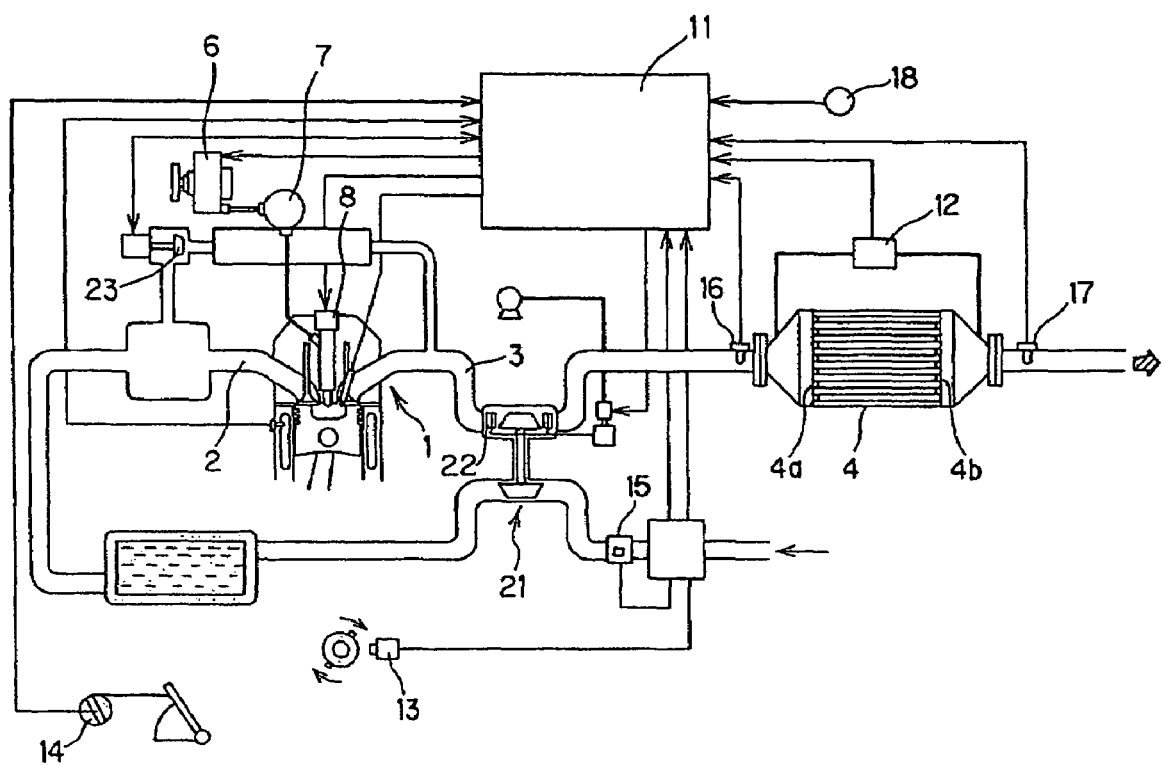
FIG. 1 is a schematic structural drawing showing one embodiment of the present invention.

FIG. 1 is a schematic structural drawing showing one embodiment of the present invention. In FIG. 1, 1 is a diesel engine, 2 is an air intake passage, and 3 is an exhaust gas passage.

The fuel injection device is a common rail type injection device consisting of a supply pump 6, common rail 7, and injector 8. Control of fuel injection is performed by an engine controller 11 constituted mainly by a microprocessor. That is, in order to prevent the generation of smoke that often occurs near full load, the maximum injection amount Qfmax is found according to cylinder intake air amount Qac calculated from the output of an air flowmeter 15 and engine rotational speed Ne from an engine rotational speed sensor 13, and the basic fuel injection amount according to the accelerator opening angle from an accelerator sensor 14 is restricted to this maximum injection amount Qfmax. The limited fuel injection amount Qf is injected with the optimum timing using the fuel injection device.

A filter 4 is provided in the exhaust gas passage 3 to trap particulates in the exhaust gas. When the amount of particulates trapped in the filter 4 (the accumulated amount) reaches a predetermined value, the exhaust gas temperature is raised and the particulates are combusted and removed. Also, an oxidation catalyst is held in the filter 4's carrier (ceramic or metal, etc.) to clean HC and CO in the exhaust.

In order to detect the filter 4's pressure loss (pressure difference upstream and downstream from the filter) a pressure difference sensor 12 is provided in a pressure difference detection passage that bypasses the filter 4.

The filter 4's pressure loss detected by the pressure difference sensor 12 is sent to the engine controller 11, and based on the detected pressure difference, the engine controller 11 regenerates the filter 4. That is, the pressure loss ΔP detected by the pressure difference sensor 12 before regeneration and the regeneration start decision value are compared, and the engine controller 11 decides whether or not the regeneration start period has been reached. If the regeneration start period has been reached, the exhaust gas temperature is raised and regeneration of the filter 4 is started. During regeneration, the pressure loss ΔP detected by the pressure difference sensor 12 and the regeneration end decision value are compared, and the controller 11 determines whether or not the regeneration end period has been reached. If the regeneration end period has been reached, regeneration ends.

Filter 4's regeneration treatment works by raising the exhaust gas temperature by delaying the injection timing for fuel injected from the fuel injection device later than usual, or by performing an additional injection (post injection) after the usual injection, etc.

Assuming an engine that regenerates a filter 4, the present invention estimates the bed temperature of the filter 4 during regeneration of the filter 4 based on the filter 4's physically modeled temperature characteristics, filter inlet temperature Tin (first temperature), and filter outlet temperature Tout (second temperature), and regenerates the filter 4 in such a way that the estimated bed temperature does not exceed the filter 4's critical temperature.

Figure 2:
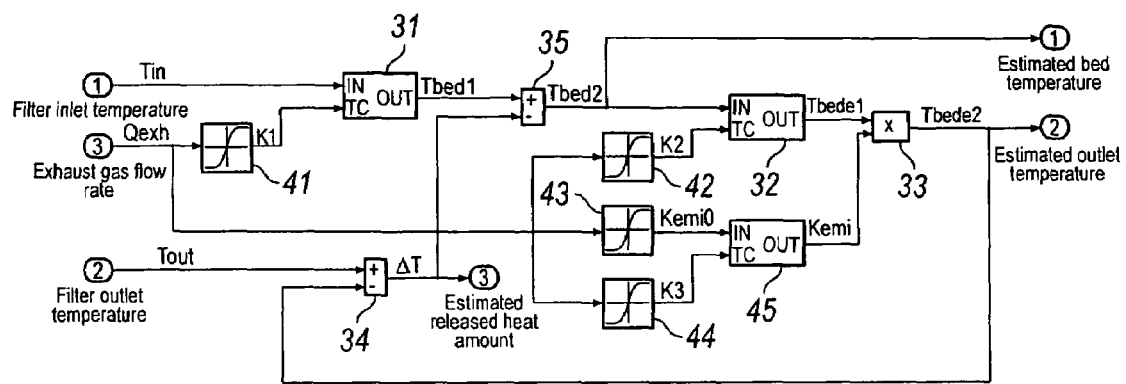
FIG. 2 is a block diagram illustrating a filter's estimated bed temperature calculation.

FIG. 2 illustrates the functions related to the calculation of the estimated bed temperature Tbed by the engine controller 11 as blocks. The estimated bed temperature calculation device consists of weighted average units 31 and 32, multiplication unit 33, subtraction unit 34, addition unit 35, weighted average coefficient calculation units 41 and 42, a heat radiation coefficient calculation unit (consisting of a basic heat radiation coefficient calculation unit 43, a weighted average coefficient calculation unit 44, and a weighted average unit 45), and a processor (not shown in the drawing) that repeatedly executes the processing of units 31-35 and units 41-45 at each constant cycle (for example, about 20 μs).

First, the weighted average unit 31 calculates the filter 4's hypothetical bed temperature Tbed1 based on filter inlet temperature Tin detected by a temperature sensor 16 using the following equation:

$$Tbed1 = Tin \times K1 + Tbed1(\text{previous value}) \times (1-K1) \quad (1),$$

where K1 is a weighted average coefficient and Tbed1 (previous value) is the Tbed1 calculated for the previous cycle. Equation (1) is an equation that calculates the temperature, which changes with a first-order delay in relation to the filter inlet temperature Tin, as the filter 4's hypothetical bed temperature.

Here, the filter 4 is generally cylindrical in shape, and this cylindrical filter 4 has a structure such that exhaust gas flows in from a filter front face 4a in the axial direction (to the right in FIG. 1) and flows out from a filter rear face 4b, so although one refers simply to "bed temperature" there is a predetermined range from the temperature at a site near the filter front face 4a (near filter inlet temperature Tin) to the temperature at a site near the filter rear face 4b (near filter outlet temperature Tout). Thus, from the filter front face 4a to the filter rear face 4b, the temperature of the site where the temperature becomes the highest (a position downstream from the axial center) is referred to as the "bed temperature."

When exhaust gas at temperature Tin is introduced from the filter front face 4a, the bed temperature of the filter 4 does not rise stepwise to Tin to correspond to this. The rise in the bed temperature relative to Tin is delayed by exactly the component corresponding to the heat capacity from the filter front face 4a until the site at the maximum temperature (hereinafter "maximum temperature site"), so the equation (1) approximates this delay as a first-order delay, i.e., expresses the temperature characteristics of the maximum temperature site as a physical model. Therefore in equation (1) an adapting value is weighted average coefficient K1. K1 is determined by and depends on the heat capacity from the filter front face 4a to the maximum temperature site (a constant value) and the exhaust gas flow rate (a variable value).

Figure 3:
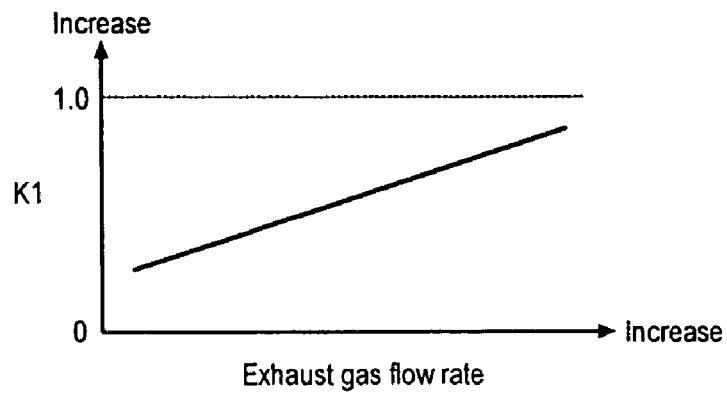
FIG. 3 is a characteristics diagram for weighted average coefficient K1.

Accordingly, the weighted average coefficient K1, which is a value equivalent to a time constant for calculating the hypothetical bed temperature, is found at the weighted average coefficient calculation unit 41, based on exhaust gas flow rate Qexh, by searching a table whose contents are FIG. 3. Making the weighted average coefficient K1 increase as exhaust gas flow rate Qexh increases as shown in FIG. 3 is done so that as exhaust gas flow rate Qexh increases, the hypothetical bed temperature Tbed1, which is the estimated temperature value for the filter 4's maximum temperature site, can be made to closely respond to and approach filter inlet temperature Tin.

Next, the weighted average unit 32 calculates the filter 4's hypothetical estimated outlet temperature Tbede1 based on hypothetical bed temperature Tbed1 using the following equation:

$$Tbede1 = Tbed1 \times K2 + Tbede1(\text{previous value}) \times (1-K2) \quad (2),$$

where K2 is a weighted average coefficient and Tbede1 (previous value) is the Tbede1 calculated for the previous cycle.

Equation (2) is an equation that calculates the temperature, which changes with a first-order delay in relation to the hypothetical bed temperature Tbed1, as the filter 4's hypothetical estimated outlet temperature Tbede1. The rise in the filter 4's outlet temperature relative to hypothetical bed temperature Tbed1 is additionally delayed by exactly the component corresponding to the heat capacity from the maximum temperature site to the filter rear face 4b, so equation 2 approximates this delay as a first-order delay, i.e. expresses the temperature characteristics of the filter rear face 4b as a physical model. Therefore in equation (2) too an adapting value is weighted average coefficient K2; K2 is determined by and depends on the heat capacity from the maximum temperature site to the filter rear face 4b (a constant value) and the exhaust gas flow rate (a variable value).

Figure 4:
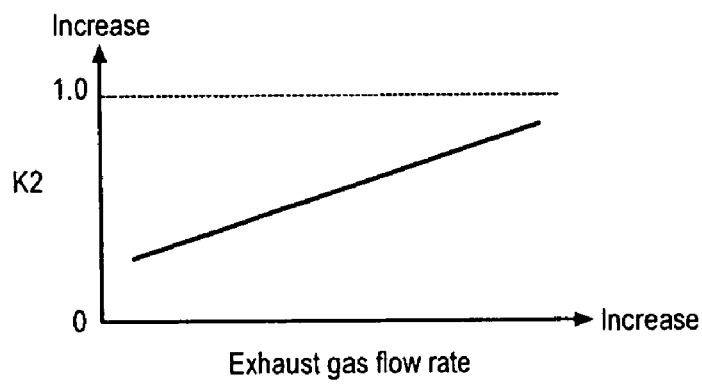
FIG. 4 is a characteristics diagram for weighted average coefficient K2.

Accordingly, the weighted average coefficient K2, which is a value equivalent to a time constant for calculating the estimated outlet temperature, is found at the weighted average coefficient calculation unit 42, based on exhaust gas flow rate Qexh, by searching a table whose contents are FIG. 4. Making the weighted average coefficient K2 increase as exhaust gas flow rate Qexh increases as shown in FIG. 4 is done so that as exhaust gas flow rate Qexh increases, the filter 4's hypothetical estimated outlet temperature Tbede1 can be made to closely respond to and approach hypothetical bed temperature Tbed1, which is the estimated temperature value of the filter 4's maximum temperature site.

The multiplication unit 33 calculates the filter 4's estimated outlet temperature Tbede2 using the following equation:

$$Tbede2 = Tbede1 \times Kemi \quad (3),$$

where Kemi is the filter 4's heat radiation coefficient.

The filter 4's atmosphere temperature is the atmosphere (external atmosphere), so heat radiates from the filter 4's hot carrier to the external atmosphere. Equation (3) is designed to reflect that the bed temperature is lowered by exactly the heat component lost from the filter 4's carrier to the external atmosphere.

Equation (3)'s heat radiation coefficient Kemi is found as follows. That is, the basic heat radiation coefficient calculation unit 43 finds the basic heat radiation coefficient Kemi0, based on exhaust gas flow rate Qexh, by searching a table whose contents are FIG. 5, and the weighted average coefficient calculation unit 44 finds the weighted average coefficient K3, which is a value equivalent to a time constant for heat radiation, based on exhaust gas flow rate Qexh, by searching a table whose contents are FIG. 6. The weighted average unit 45 calculates the heat radiation coefficient Kemi using the basic heat radiation coefficient Kemi0 and the weighted average coefficient K3 according to the following equation:

$$Kemi = Kemi0 \times K3 + Kemi(\text{previous value}) \times (1 - K3) \quad (4).$$

Equation 4 is an equation that calculates the value, which changes with a first-order delay in relation to the basic heat radiation coefficient Kemi0, as the filter 4's heat radiation coefficient Kemi.

Figure 5:
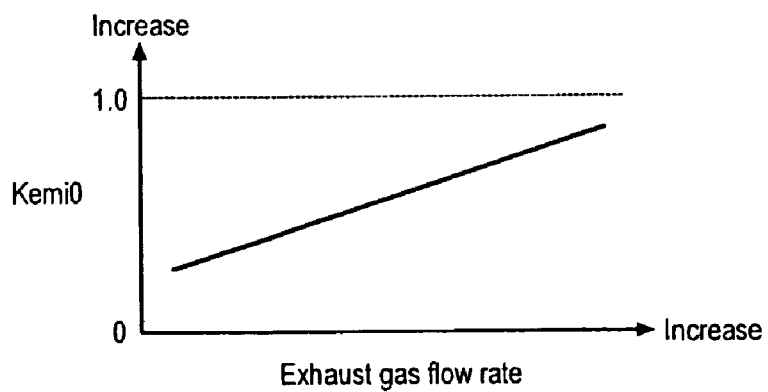
FIG. 5 is a characteristics diagram for basic heat radiation coefficient Kemi0.

Here, the basic heat radiation coefficient Kemi0 is a positive value smaller than 1.0; it is a variable value whose parameter is exhaust gas flow rate Qexh, as shown in FIG. 5. The smaller the exhaust gas flow rate Qexh is, the more heat is lost from the filter 4's bed, so the basic heat radiation coefficient Kemi0 becomes smaller as the exhaust gas flow rate Qexh becomes smaller.

Figure 6:
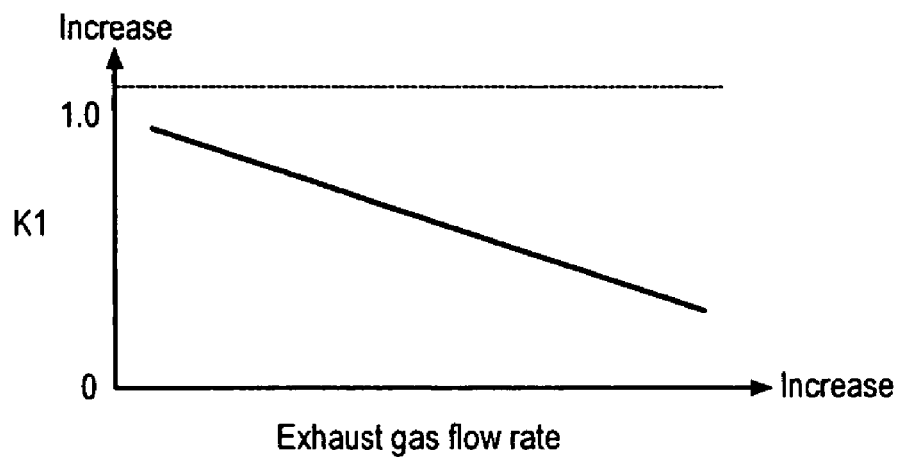
FIG. 6 is a characteristics diagram for weighted average coefficient K3.

Weighted average coefficient K3 in equation (4) is a value that increases as the exhaust gas flow rate Qexh becomes smaller, as shown in FIG. 6. This corresponds to the occurrence of error in calculating estimated bed temperature Tbed2 when decelerating.

Figures 8A, 8B:
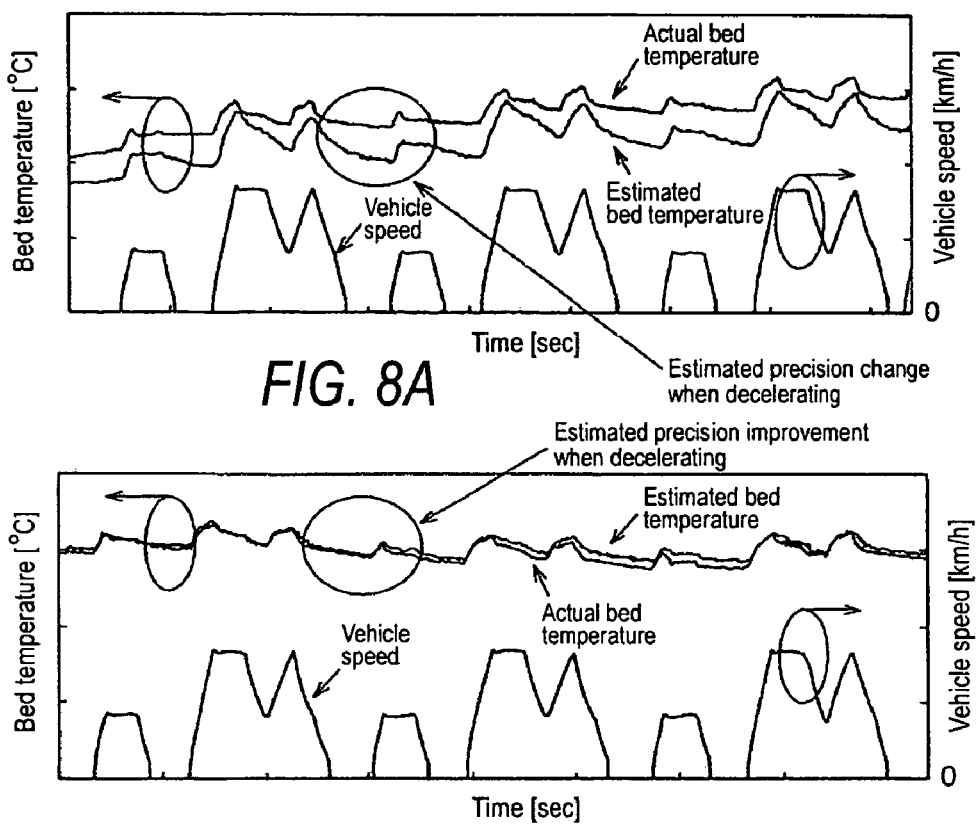
FIGS. 8A & 8B are waveform diagrams

To explain this, FIG. 8A shows changes in bed temperature during mode running. Here, the top level shows changes in the filter 4's estimated bed temperature Tbed2 when the basic heat radiation coefficient Kemi0 is used as-is for the heat radiation coefficient Kemi. This shows that the filter 4's estimated bed temperature Tbed2 is lower than the actual bed temperature when decelerating if the basic heat radiation coefficient Kemi0 is used as-is for the heat radiation coefficient Kemi.

Figure 7:
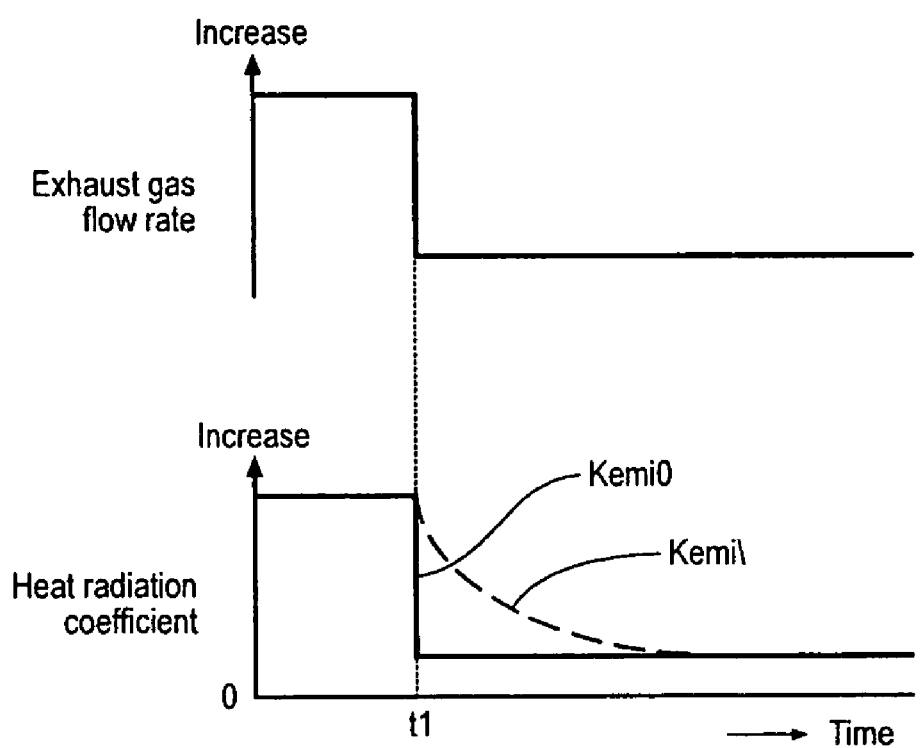
FIG. 7 is a waveform diagram showing changes in the heat radiation coefficient when decelerating.

To explain the cause of this with reference to FIG. 7's model, let us assume a case in which exhaust gas flow rate Qexh when decelerating decreases stepwise as shown in the top level of FIG. 7. In this case, basic heat radiation coefficient Kemi0, which is the table value, also decreases stepwise as shown by the solid line in the bottom level of FIG. 7. Accordingly, the estimated outlet temperature Tbede2 decreases rapidly when decelerating because the filter 4's estimated bed temperature Tbede2 is calculated using the basic heat radiation coefficient Kemi0 as-is.

Nevertheless, in reality the filter 4's outlet temperature decreases with a delayed response, so the filter 4's estimated bed temperature Tbed2 can be thought of as shifting lower than in reality.

In this case, if a value that changes with a first-order delay in relation to basic heat radiation coefficient Kemi0 is considered as heat radiation coefficient Kemi as indicated by the dotted line in the bottom level of FIG. 7, the filter's estimated outlet temperature Tbede2 when decelerating changes more slowly than when the basic heat radiation coefficient Kemi0 is used as is for the heat radiation coefficient Kemi, so it is possible to prevent the filter 4's estimated bed temperature Tbed2 from shifting lower than in reality, as shown in the bottom level of FIG. 8, and it can approximate the actual bed temperature.

The weighted average coefficient K3 becomes smaller as the exhaust gas flow rate Qexh becomes smaller, as shown in FIG. 6, for the following reason. That is, the heat radiation response is more gradual when the exhaust gas flow rate Qexh is in the high region than when the exhaust gas flow rate Qexh is in the low region, i.e. the time constant of the heat radiation response should be large (therefore the weighted average coefficient K3, which has an inverse relationship with the time constant, should be small).

The exhaust gas flow rate Qexh needed for the above-described FIG. 3 through FIG. 6 can be replaced with the air intake flow rate detected by the air flow meter 15.

The subtraction unit 34 subtracts the filter 4's estimated outlet temperature Tbede2 (second temperature's estimated temperature) from the filter 4's outlet temperature Tout detected by the temperature sensor 17 (detected second temperature) and calculates temperature difference $\Delta T$ (=Tout−Tbede2). That is, temperature difference $\Delta T$ is found by the following equation:

$$\Delta T = Tout - Tbede2 \quad (5).$$

Here, if not all the particulates accumulate in the filter 4 and not all of the oxidation catalyst is held in the filter 4's carrier, particulates do not combust in the filter 4, and HC and CO in the exhaust gas are not oxidized (combusted) by the oxidation catalyst, so the filter 4's estimated outlet temperature Tbede2 at this time matches the actual filter outlet temperature Tout detected by the temperature sensor 17; therefore the above-described temperature difference $\Delta T$ in equation (5) should be essentially zero.

In reality, particulates accumulated in the bed of the filter 4 are combusted during regeneration, and HC and CO in the exhaust gas are combusted by a catalytic reaction by the oxidation catalyst held in the carrier, so it is necessary to reconstitute a value that is the value $\Delta T$, which adds a first temperature rise component $\Delta T1$ due to combustion of particulates in the filter 4's bed and a second temperature rise component $\Delta T2$ due to oxidation catalytic reaction (combustion) of HC and CO in the exhaust gas ($\Delta T = \Delta T1 + \Delta T2$), added to the above-described hypothetical bed temperature Tbed1 as the estimated bed temperature.

Accordingly, the addition unit 35 calculates the estimated bed temperature Tbed2 by adding the value of the temperature change $\Delta T$ from equation (5) to the hypothetical bed temperature Tbed1, i.e. calculates the estimated bed temperature Tbed2 by the following equation:

$$Tbed2 = Tbed1 + \Delta T \quad (6).$$

In accordance with this equation, it is necessary to replace Tbed1 in the right side of equation (2) with Tbed2, which makes equation (2) as follows:

$$Tbede1 = Tbed2 \times K2 + Tbede1(\text{previous value}) \times (1 - K2) \quad (2A),$$

where K2 is a weighted average coefficient and Tbede1 (previous value) is the Tbede1 calculated for the previous cycle.

Thus the temperature difference ΔT between the filter 4's outlet temperature Tout and the filter 4's estimated outlet temperature Tbede2 is found, and this temperature difference ΔT is fed back to the hypothetical bed temperature, so it becomes possible to calculate the estimated bed temperature with good precision without acquiring large amounts of data when calculating the estimated bed temperature, and it becomes possible to avoid deterioration of the catalyst due to abnormally high temperature when doing filter regeneration and to avoid melting and damaging the filter.

Also, processing of the above-described weighted average units 31 and 32, multiplication unit 33, subtraction unit 34, addition unit 35, weighted average coefficient calculation units 41 and 42, basic heat radiation coefficient calculation unit 43, weighted average coefficient calculation unit 44, and weighted average unit 45 is repeatedly executed at each constant cycle (for example, about 20 μs).

With the estimated bed temperature calculation device constituted in this manner, experiments were conducted to see how the temperatures for the above-described filter inlet temperature Tin, hypothetical bed temperature Tbed1, and estimated bed temperature Tbed2 changed after regeneration treatment began in a stationary state. The results shown in FIG. 9 were obtained.

Here, it was confirmed that in a stationary state and in a quasi-stationary state the calculated values (temperatures for the filter inlet temperature Tin, hypothetical bed temperature Tbed1, and estimated bed temperature Tbed2) matched the actual values well. However, FIG. 9 shows this modeled for ease of understanding.

Figure 9:
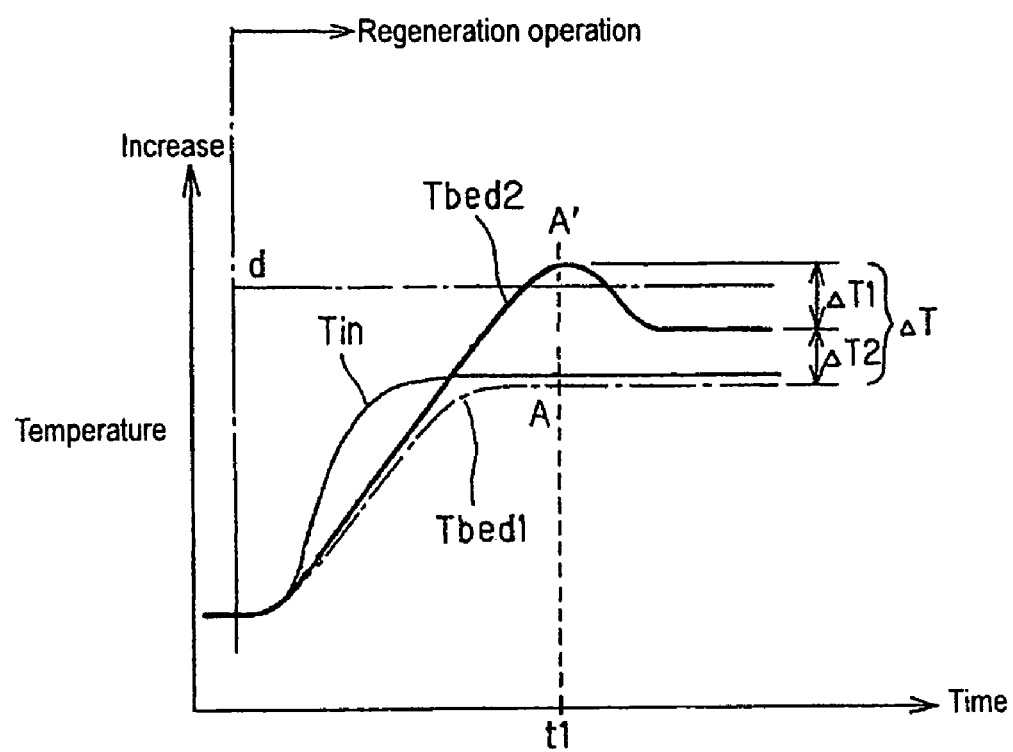
FIG. 9 is a diagram of temperature changes when regenerating the filter.

To explain FIG. 9, the estimated bed temperature Tbed2 peaks at time t1, which is a predetermined time after the start of regeneration. Subsequently it decreases, and proceeds while maintaining a value that is higher than the hypothetical bed temperature Tbed1 by exactly a constant difference (ΔT2). The temperature rise component ΔT1 due to particulate combustion is supposed to peak during a period after filter regeneration starts and when particulates are actively combusting, and then gradually decline and become zero after all of the particles have combusted, so the difference between the estimated bed temperature Tbed2 and the hypothetical bed temperature Tbed1 expresses this phenomenon well.

On the other hand, the temperature difference ΔT2 when the hypothetical bed temperature Tbed1 and the estimated outlet temperature Tbede2 are parallel is equivalent to the second temperature rise component due to oxidation catalytic reaction (combustion) of exhausted HC and CO when the filter 4 is regenerating and operating. That is, the HC and CO in exhaust gas is constant in a stationary state, and in correspondence with this, the estimated bed temperature Tbed2 is higher than the hypothetical bed temperature Tbed1 by exactly a constant value.

Thus, when the estimated bed temperature Tbed2 is found, this estimated bed temperature Tbed2 expresses the bed's maximum temperature, so when performing regeneration, the estimated bed temperature Tbed2 and the filter's critical temperature are compared, and when the estimated bed temperature Tbed2 exceeds the filter's critical temperature, control is performed to reduce the oxygen concentration of the exhaust gas. For example, the bed's combustion temperature depends on the oxygen concentration of the exhaust gas, and given the same amount of particulate accumulation, a high oxygen concentration raises the combustion temperature more than a low oxygen concentration, so control is performed to reduce the oxygen concentration of the exhaust gas when the estimated bed temperature Tbed2 exceeds the filter's critical temperature. The oxygen concentration of the exhaust gas may be reduced by reducing the amount of intake air or by increasing the injected fuel amount. To reduce the air intake amount, if a variable capacity turbo charger 21 is provided, the opening angle of a variable nozzle 22 may be increased; if an EGR valve 23 (EGR device) is provided, the EGR percentage or EGR amount may be increased.

The operating effect of this embodiment shall now be explained with reference to FIG. 9.

According to this embodiment, the temperature of the filter 4's maximum temperature site (an intermediate site between the filter front face 4a and the filter rear face 4b) during regeneration is calculated as the estimated bed temperature Tbed2 based on the filter 4's physically modeled temperature characteristics and the filter inlet temperature Tin (first temperature) and the filter 4's hypothetical estimated outlet temperature Tbede1 (second temperature's hypothetical estimated temperature), so the temperature of the maximum temperature site—including temperature rise component ΔT1 due to combustion of accumulated particulates—can be understood simply and accurately, regardless of the amount of particulates accumulated in the filter 4, using this calculated estimated bed temperature Tbed2.

Moreover, according to this embodiment, the coefficient Kemi for heat radiation from the filter 4 to the external atmosphere is calculated according to exhaust gas flow rate Qexh, and the filter 4's hypothetical estimated outlet temperature Tbede1 (second temperature's hypothetical estimated temperature) is reduced and corrected using this heat radiation coefficient Kemi, so the estimated outlet temperature Tbede2 of the filter 4 can be calculated with reasonable precision even if there are differences in the amount of heat radiated from the filter 4 to the external atmosphere due to variations in exhaust gas flow rate.

Also, the basic heat radiation coefficient Kemi0 is used as is as the heat radiation coefficient Kemi, so the estimated bed temperature Tbed2 is lower than the actual value when decelerating, but according to one embodiment, the heat radiation coefficient Kemi is calculated with a time delay applied to the basic heat radiation coefficient Kemi0, so it is possible to prevent the estimated bed temperature Tbed2 from going lower than the actual value, especially when decelerating.

Also, the filter 4's temperature characteristics—that is, hypothetical bed temperature Tbed1 and hypothetical estimated outlet temperature Tbede1 (the second temperature's hypothetical estimated temperature)—are found with just a first-order delay (physical model), so in one embodiment, only the weighted average coefficients K1 and K2 used in first-order delay processing are adaptive values, and the values of these weighted average coefficients K1 and K2 are respectively determined by and depend on the filter 4's heat capacity from the filter front face 4a to the maximum temperature site (a constant value) and the exhaust gas flow rate (a variable value) and on the filter 4's heat capacity from the maximum temperature site to the filter rear face 4b (a constant value) and the exhaust gas flow rate (a variable value). That is, if K1 and K2, which are adaptive values, are considered at a predetermined (constant) exhaust gas flow rate, they are determined without dependence on operating conditions or the amount of particulates accumulated in the filter 4, so it is possible to eliminate the vast amount of labor required to match a table or map, and even if the specifications of the filter 4 change, it is possible to easily respond to this simply by responding to the heat capacity of the filter 4 after the change.

In practice, to respond to the exhaust gas flow rate departing from the predetermined exhaust gas flow rate, according to one embodiment, the hypothetical estimated outlet temperature Tbede1 (second temperature's hypothetical estimated temperature) is found using the first-order delayed value (hypothetical bed temperature Tbed1) of the filter 4's inlet temperature Tin (first temperature), and the weighted average coefficient K1 used in calculating that first-order delayed value is set according to exhaust gas flow rate Qexh, so the delayed value can be calculated with reasonable precision regardless of differences in the exhaust gas flow rate Qexh.

Similarly, to respond to the exhaust gas flow rate departing from the predetermined exhaust gas flow rate, according to one embodiment the hypothetical estimated outlet temperature Tbede1 (second temperature's hypothetical estimated temperature) is found using the estimated bed temperature Tbed2's first-order delayed value (hypothetical estimated outlet temperature Tbede1), and the weighted average coefficient K2 used in calculating that first-order delayed value (hypothetical estimated outlet temperature Tbede1) is set according to exhaust gas flow rate Qexh, so the delayed value can be calculated with reasonable precision regardless of differences in exhaust gas flow rate Qexh.

According to one embodiment, it is not necessary to change the constitution of the estimated bed temperature calculation device just because the filter 4's carrier has an oxidation catalyst for cleaning HC and CO in the exhaust gas. Even if the filter 4's carrier has an oxidation catalyst for cleaning HC and CO in the exhaust gas, the temperature of the maximum temperature site—including the temperature rise component ΔT1 due to combustion of accumulated particulates and the temperature rise component ΔT2 due to catalytic reaction of HC and CO—can be understood simply and accurately, regardless of the amount of particulates accumulated or differences in operating conditions determined by load or rotational speed, by using the estimated bed temperature Tbed2. And if the catalyst deteriorates, the temperature rise component due to this deteriorated state can be simply and accurately understood.

This above embodiment was explained for a case in which an oxidation catalyst is held in the filter 4's carrier, but it is understood that the present invention may also be employed in a case in which an oxidation catalyst is not held in the filter 4's carrier.

This above embodiment was explained for a case in which an intermediate site between the filter front face 4a and the filter rear face 4b was the maximum temperature site, but it is understood that the invention is not limited to this.

This above embodiment was explained for a case in which the filter inlet temperature was detected by a temperature sensor 16, but the filter inlet temperature may also be estimated using other known means according to running conditions.

This above embodiment was explained for a case in which the temperature difference between the estimated outlet temperature obtained by applying a time delay to the filter's inlet temperature and the detected outlet temperature was fed back to the estimated bed temperature for correction, but the present invention is not limited to this configuration. It is also possible to do correction by feeding back the temperature difference between the estimated inlet temperature obtained by applying a time advance to the filter's outlet temperature and the detected inlet temperature to the estimated bed temperature.

The function of the estimated bed temperature calculation device is illustrated by the block diagram in FIG. 2. The function of the estimated temperature calculation device is accomplished by the weighted average units 31 and 32 and the subtraction unit 34 in FIG. 2. The function of the heat radiation coefficient calculation device is accomplished by the basic heat radiation coefficient calculation unit in FIG. 2. The function of the estimated temperature correction device is accomplished by the multiplication unit 33 in FIG. 2. The function of the regeneration treatment execution device is accomplished by the engine controller 11.

The preceding description has been presented only to illustrate and describe exemplary embodiments of the apparatus of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A regeneration control device that regenerates a filter that traps microscopic particulate matter in the exhaust gas of an engine, comprising:
 a first temperature sensor that detects the temperature either upstream or downstream from the filter as a first temperature;
 a second temperature sensor that detects the other temperature as a second temperature; and
 a microcomputer to:
  calculate a hypothetical bed temperature of the filter based on the first temperature detected by the first temperature sensor or the second temperature detected by the second temperature sensor;
  calculate a heat radiation coefficient corresponding to heat radiated from the filter to the external atmosphere according to an exhaust gas flow rate;
  calculate an estimated temperature of the second temperature based on the first temperature detected by the first temperature sensor and the heat radiation coefficient;
  calculate an estimated bed temperature of the filter based on the hypothetical bed temperature and based on a difference between the second temperature detected by the second temperature sensor and the second temperature's estimated temperature; and
  control the engine so as to raise the engine's exhaust gas temperature based on the estimated bed temperature.

2. The regeneration control device of claim 1, wherein:
 the second temperature's estimated temperature is calculated based on the first temperature detected by the first temperature sensor, and
 the second temperature's estimated temperature is calculated by correcting the second temperature's hypothetical estimated temperature with the heat radiation coefficient.

3. The regeneration control device of claim 1, wherein:
 the heat radiation coefficient is calculated as a delayed response of the heat radiation coefficient to a basic heat radiation coefficient that corresponds to the exhaust gas flow rate.

4. The regeneration control device of claim 2, wherein:
 the first temperature is the filter inlet temperature,
 the second temperature is the filter outlet temperature, and the microcomputer also:
calculates the filter outlet temperature's hypothetical estimated temperature as a delayed response of the filter outlet temperature's hypothetical estimated temperature to the filter inlet temperature.

5. The regeneration control device of claim 4, wherein:
the hypothetical bed temperature is calculated as a delayed response of the hypothetical bed temperature to the filter inlet temperature, and
the filter outlet temperature's hypothetical estimated temperature is calculated as a delayed response of the filter outlet temperature's hypothetical estimated temperature to the estimated bed temperature.

6. The regeneration control device of claim 4, wherein:
the filter outlet temperature's hypothetical estimated temperature changes with a first-order delay relative to the filter inlet temperature (Tin), and
a weighted average coefficient that adjusts this first-order delay change is set according to the exhaust gas flow rate.

7. The regeneration control device of claim 5, wherein:
the filter outlet temperature's hypothetical estimated temperature changes with a first-order delay relative to said estimated bed temperature, and
a weighted average coefficient that adjusts this first-order delay change is set according to the exhaust gas flow rate.

8. The regeneration control device of claim 1, wherein:
the microcomputer performs regeneration control while keeping the estimated bed temperature smaller than a predetermined critical position of the filter.

9. The regeneration control device of claim 1, wherein:
the filter has an oxidation catalyst to oxidize HC and CO in the exhaust gas.

10. The exhaust gas after-treatment device of claim 1, wherein:
the first temperature is the filter outlet temperature,
the second temperature is the filter inlet temperature, and
the microcomputer also: calculates the filter inlet temperature's estimated temperature based on the detected filter outlet temperature, and calculate the estimated bed temperature based on the detected filter inlet temperature and the filter inlet temperature's estimated temperature.

11. The regeneration control device of claim 4, wherein:
the filter outlet temperature is the maximum temperature of the filter outlet during regeneration control.

12. A regeneration control method that regenerates a filter that traps microscopic particulate matter in the exhaust gas of an engine, comprising
detecting the temperature either upstream or downstream from the filter as a first temperature;
detecting the other temperature as a second temperature;
calculating the filter's hypothetical bed temperature based on the first temperature or the second temperature;
calculating a heat radiation coefficient corresponding to heat radiated from the filter to the external atmosphere according to an exhaust gas flow rate;
calculating an estimated temperature of the second temperature based on the first temperature and the heat radiation coefficient;
calculating the filter's estimated bed temperature based on the hypothetical bed temperature and based on a difference between the second temperature and the second temperature's estimated temperature; and
controlling the engine so as to raise the engine's exhaust gas temperature based on the estimated bed temperature.

13. A regeneration control device that regenerates a filter that traps microscopic particulate matter in the exhaust gas of an engine, comprising:
first temperature sensor means for detecting the temperature either upstream or downstream from the filter as a first temperature;
second temperature sensor means for detecting the other temperature as a second temperature;
means for calculating the filter's hypothetical bed temperature based on the first temperature detected by the first temperature sensor means or the second temperature detected by the second temperature sensor means;
means for calculating a heat radiation coefficient corresponding to heat radiated from the filter to the external atmosphere according to an exhaust gas flow rate, a means for calculating an estimated temperature of the second temperature based on the first temperature detected by the first temperature sensor means and the heat radiation coefficient;
means for calculating the filter's estimated bed temperature based on the hypothetical bed temperature and based on a difference between the second temperature detected by the second temperature sensor means and said second temperature's estimated temperature; and
means for controlling the engine so as to raise the engine's exhaust gas temperature based on the estimated bed temperature.

* * * * *